June 18, 1940.  J. HALLER  2,204,589

HYDRAULIC CLUTCH AND BRAKE MECHANISM

Filed March 3, 1938  3 Sheets-Sheet 1

Inventor
John Haller
By
Attorneys

June 18, 1940.    J. HALLER    2,204,589

HYDRAULIC CLUTCH AND BRAKE MECHANISM

Filed March 3, 1938    3 Sheets-Sheet 2

Inventor
John Haller
By
Attorneys

June 18, 1940. J. HALLER 2,204,589
HYDRAULIC CLUTCH AND BRAKE MECHANISM
Filed March 3, 1938 3 Sheets-Sheet 3
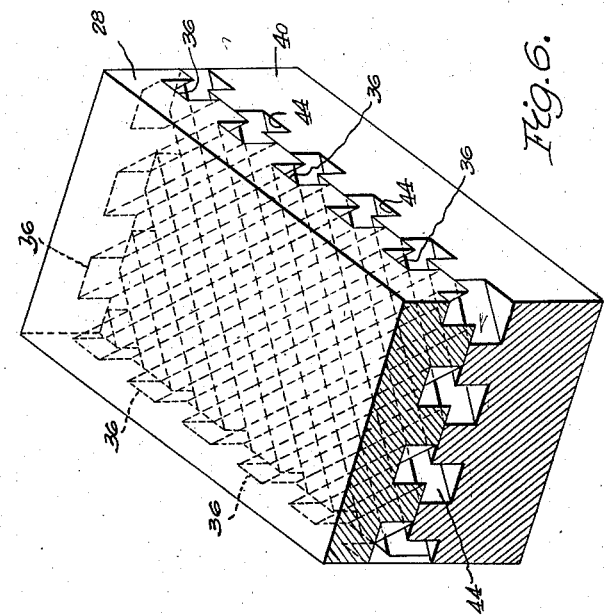
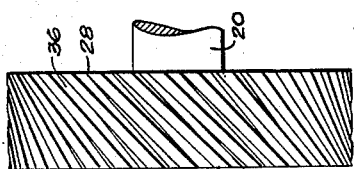
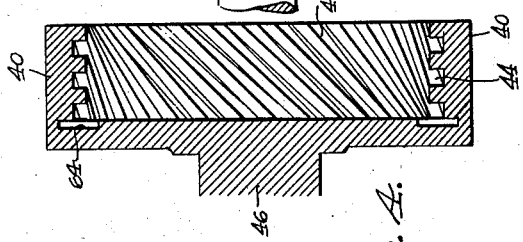
Inventor
John Haller
By
Attorneys Patented June 18, 1940

2,204,589

UNITED STATES PATENT OFFICE 2,204,589

HYDRAULIC CLUTCH AND BRAKE MECHANISM

John Haller, Detroit, Mich., assignor to J. H. Tool & Machine Works, Detroit, Mich.

Application March 3, 1938, Serial No. 193,730

10 Claims. (Cl. 192—12)

This invention relates in general to hydraulic mechanisms, and in particular to the improved construction of an apparatus of that type which is adapted for producing the actions of clutching and braking.

One of the main objects of the invention is to construct an apparatus which is simple both in construction and operation, which is spontaneously effective with a minimum of effort, which is low in cost of production and consists of few essential parts, and which is adapted for producing a clutching action or a braking action, whichever is desired.

Another object of the invention is to construct a simple hydraulically operated apparatus which is adapted for employment intermediate a driving means and a driven means and through which said driven means can be driven by or disconnected from said driving means, according to the wants of the operator.

Another object of the invention is to build an improved form of hydraulic apparatus having novelly constructed and arranged relatively movable members between which is adapted to be established a hydrostatic pressure which tends to lock said members together for eliminating the relativity of movement therebetween.

Other objects and advantages of this invention will become readily apparent with reference to the following specification taken in conjunction with the accompanying drawings of which there are three (3) sheets and in which:

Figure 1 is a vertical sectional view taken lonitudinally through the apparatus which embodies the present invention, and showing the details of construction thereof;

Figs. 2 and 3 are sectional views taken along the lines 2—2 and 3—3, respectively, of Fig. 1;

Fig. 4 is a vertical sectional view of the rotatble member of the clutch;

Fig. 5 is an elevational view of the driven member of the clutch, shown in assembly with the riven shaft, or it can be considered a view of the of the members of the brake, and Fig. 6 is a developed view of the two relatively movable members employed in either the clutch brake.

Figure 1:
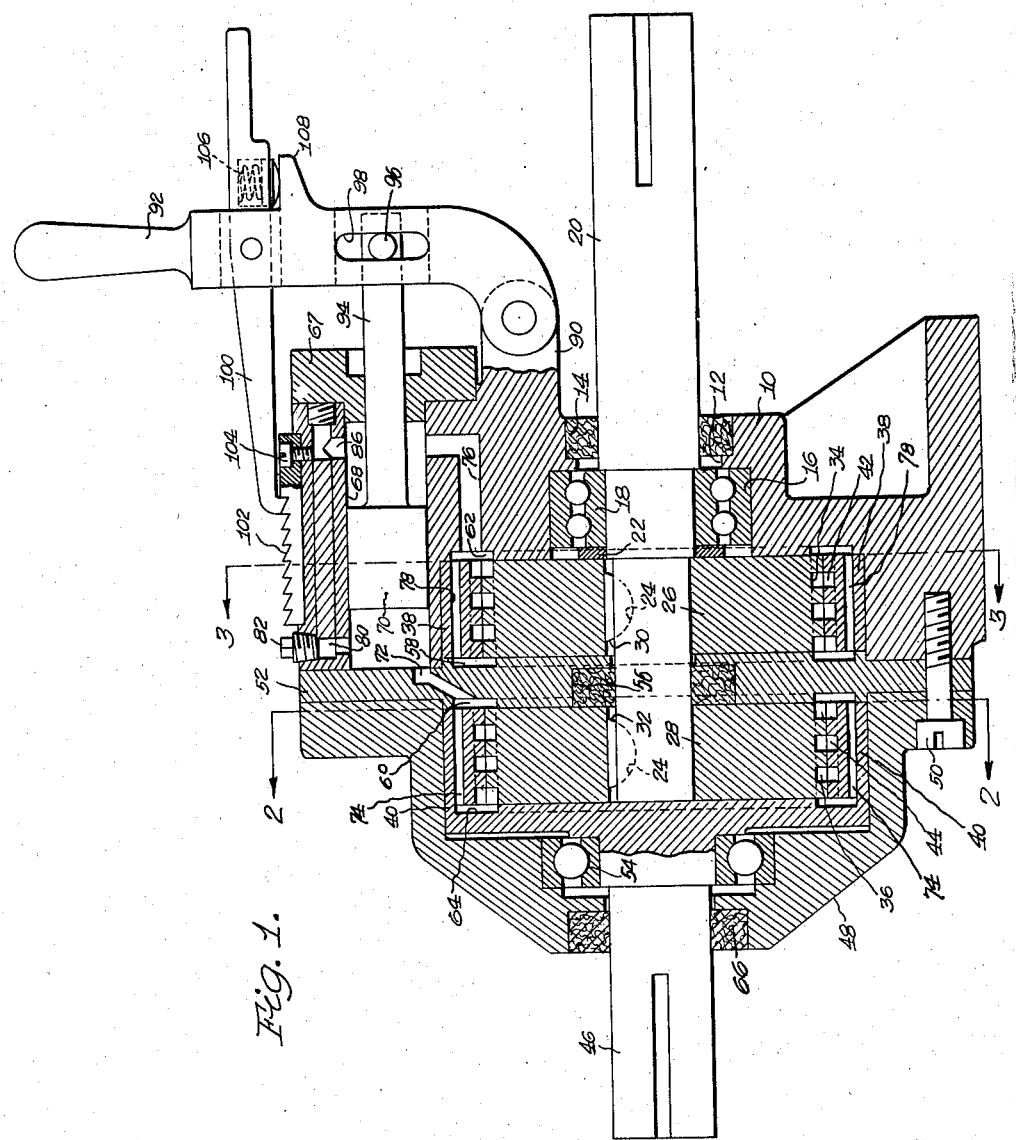
Figure 3:
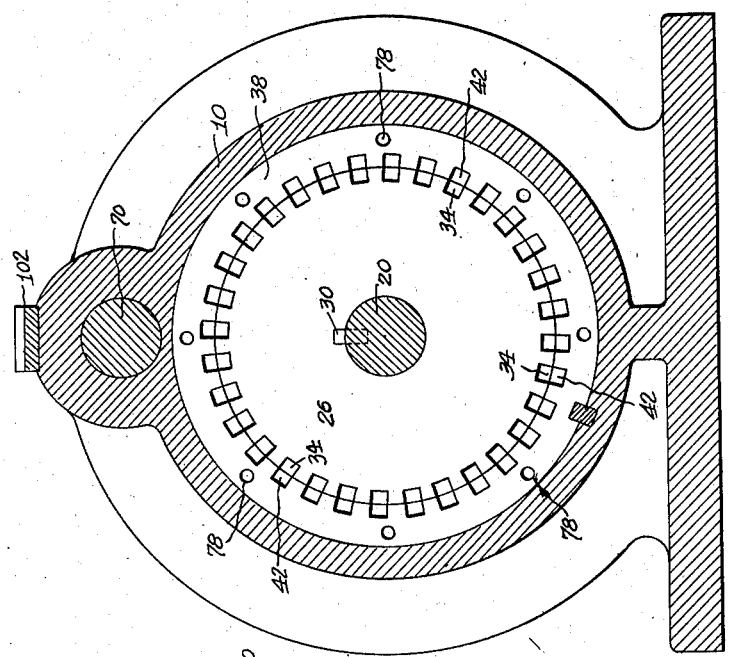
Figure 2:
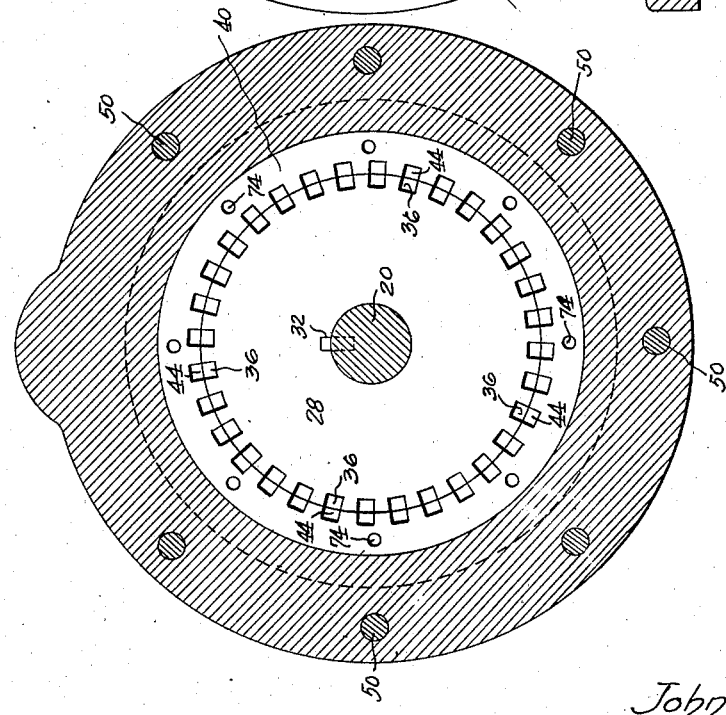

In Fig. 1 there is shown a longitudinal section trough an apparatus adapted for establishing id utilizing hydrostatic pressure for producing e actions of clutching and braking for machines such as those employed in factories, machine shops, and the like. The main body member or casting for the apparatus is represented 10 and is shown as being provided internally with a bore 12. The outer end of the bore 12, such as at 14, is enlarged for housing an oil seal of standard construction and well known in the art, such seal being adapted for preventing outward leakage of the oil or hydraulic fluid thereat. The bore 12 is also enlarged, such as at 16, for housing a bearing assembly 18 in which a shaft 20 is journaled. Riding on shaft 20 in contact with a face of the bearing 18 is a washer 22.

Shaft 20, to be considered as the driven shaft, is shown at its outer end as being provided with one well known form of connection for said shaft and a machine (not shown) to be driven thereby, but it is obvious that such connection may take any desired form, such as a pulley drive or any form of coupling which permits the transmission of power therethrough from shaft 20 to said machine. The direct driving between shaft 20 and the machine to be driven is preferred, however, because of the desirability for immediate reaction in the driven machine in accordance with changes in the rotary movements of the shaft 20.

Keyed to the shaft 20 for rotation therewith, in slots 24 provided therefor, is a pair of annular members 26 and 28, said members being provided at their inner surfaces with lugs 30 and 32, respectively, fitting into the slots 24. The union between said lugs and slots is such as to prevent longitudinal motion of members 26 and 28 along shaft 20. Each of the members 26 and 28 is formed at its periphery with a plurality of grooved passageways, represented on member 26 as at 34 and on member 28 as at 36, said passageways extending obliquely across the entire width of the periphery of its respective annular member and so that the direction thereof is neither axially nor circumferentially, but somewhere therebetween, such as at a 45° angle, a circumferential groove being ideal but impractical and an axial groove being simplest but totally ineffective. The grooves 34 and 36 can each be right hand, or they each can be left hand, or the former can be opposite to the latter. The depth, width and number of each group of grooves are immaterial as long as the passageways formed thereby permit sufficient fluid to pass thereinto for establishment therein of the necessary hydrostatic pressure desired.

Adapted for a running fit with the peripheral surfaces of members 26 and 28, is a pair of members 38 and 40, respectively, having annular surfaces arranged concentrically with respect to said peripheral surfaces of members 26 and 28. Said surfaces of members 38 and 40 are grooved at 42 and 44, respectively, similarly to the grooves 34 and 36, but in crossed relation therewith, as clearly shown in Fig. 6, so that, in assembly, grooves 34 and 42 cross each other as well as grooves 36 and 44 crossing each other, thereby forming a plurality of individual cubical spaces defined in the one case by the walls of the grooves 34 and 42, and in the other case by the walls of the grooves 36 and 44. As shown, member 40 is part of a shaft 46, being formed integral therewith, and member 38 is a separate member pressed into or otherwise held stationary in an enlarged bore provided therefor in the body member 10. It is readily apparent that member 40 and shaft 46 can be made separable, that members 38 and 10 can be made inseparable or as a single casting, that the relative positions of concentricity of members 28 and 40 can be reversed, that the relative positions of concentricity of members 26 and 38 can be reversed, and such changes in construction are contemplated.

Secured to the body member 10 for enclosing the structure therein is a dome shaped cover plate 48, by means of a plurality of bolts 50, and lying between the plate 48 and member 10, and held in place thereby, is a separator 52 which is adapted for being disposed between the members 26—38 and the members 28—40 for sealing one of said groups of members from the other. Between the shaft 46 and plate 48 is a bearing assembly 54 into which the former is journaled. The shaft 46, to be considered the driving shaft for the apparatus, is formed similarly as the outer end of driven shaft 20, but same can be changed at will. Said end of shaft 46 is adapted to be driven by a motor or other form of continuous driving means (not shown).

To enhance the sealing effectiveness of separator 52 there is formed therein an annular recess 56 in which is disposed an oil seal similar to that used at 14 in bore 12. Also formed in separator 52, on its opposite faces, is a pair of annular channelled recesses 58 and 60, extending radially from the bottom walls of grooves 34 and 36, respectively, to substantially beyond the bottom walls of grooves 42 and 44, respectively. Members 10 and 40 are also formed with annular channelled recesses 62 and 64, respectively, similar to recesses 58 and 60, but providing communication between the grooves on the grooved members on the opposite sides thereof. It is readily apparent that recesses 58 and 62 can be formed in the opposite faces of members 26 and 38, rather than in the walls of separator 52 and body member 10, as shown, and that the recesses 60 and 64 can be formed in the opposite faces of members 28 and 40, rather than in the walls of separator 52 and member 40, as shown, without departing from the spirit of the invention.

Plate 48 is provided with a bore 66 in which is disposed an oil seal similar to those employed at 14 and 56, for preventing oil leakage thereat and generally improving the tightness of the closed system used herein.

Main body member 10 is provided with a cylindrical bore, closed at one end with a cap member 67, said bore forming a fluid chamber 68 in which a piston 70 is adapted to reciprocate. One end of chamber 68 communicates with a passageway 72 in separator 52, said passageway itself being in communication with the passageway 60 which intercommunicates with the grooves 36 and 44 in members 28 and 40, respectively. There is provided in member 40, between its periphery and the grooves 44 therein, a plurality of spaced passageways 74 which serve to intercommunicate the annular passageways 60 and 64, so that any pressure created ahead of piston 70, by a movement thereof to the left, reacts in opposing directions within the grooves 36 and 44, tending to lock the members 28 and 40 together due to the hydrostatic pressure set up in the cubical spaces (see Fig. 6) which are common to the grooves on both members. A short movement of piston 70 toward the left, in a fluid filled system, is sufficient to lock members 28 and 40 together, thereby causing shaft 20, since member 28 is keyed thereto, to be driven by and at substantially the same rate of rotation of shaft 46 of which member 40 is shown as being a part, although it is obvious that a shorter movement of the piston will react to give only partial locking, if such is desired.

At the other end of chamber 68, behind piston 70, is an opening which communicates said chamber with a passageway 76 in body member 10, said passageway 76 communicating with the annular passageway 62 in member 10. In member 38, between its periphery and the grooves 42 therein, there is provided a plurality of circumferentially spaced passageways 78 which communicate the passageway 62 in member 10 with the passageway 58 in separator 52. Therefore, when the piston 70 is moved to the right after the shafts 46 and 20 have been caused to rotate together, the pressure set up by such movement is transmitted through the passageway 76 into the grooves 34 and 42 in members 26 and 38, respectively, in opposite directions, the hydrostatic pressure set up when these opposing pressures meet causing the rotatable member 26, which is keyed to shaft 20, to lock with the fixed member 38 and thereby substantially braking the rotation of the driven shaft 20. Naturally, the clutching action between the members 28 and 40 will have ceased when the piston 70 is moved to the right because of the relief in pressure therebetween by such movement of said piston.

For filling the chamber 68 and the various fluid passageways and grooves ahead of piston 70 in the fluid system with fluid there is provided an opening 80 in the top of the body member 10, said opening being adapted to be closed by a screw 82. Then, for filling with fluid the portions of chamber 68 and the various fluid passageways and grooves in the fluid system lying on the opposite side of piston 70 there is provided an opening 86.

Body member 10 is provided with an outwardly projecting lug 90 to which is pivotally connected a handle 92. Intermediate the ends of handle 92, and in slotted engagement therewith, is connected the end of a piston rod 94, said piston rod being rigidly secured to piston 70 and passing outwardly from chamber 68 through an opening provided therefor in cap 67, said end of rod 94 being provided with a pin 96 which is engageable with handle 92 in a slot 98 provided therein. Intermediate the upper end of handle 92 and the slot 98 there is pivoted to said handle a pawl 100 which is adapted for engagement with a ratchet 102, said ratchet being secured to body member 10 as by means of a bolt 104, and the opening for said bolt communicating with the filler opening 86. For the purpose of maintaining engagement between the pawl and ratchet, the pawl is provided with a recess in which is housed and secured a spring 106, said spring being adapted to act against a ledge 108 formed on the handle 92 for urging the pawl about its pivot toward the ratchet. Since the piston 70 is shown in neutral position (the shaft 20, in other words, being idle), and if clutching action is desired, it is only necessary to force the handle 92 toward the left about its pivot, this causing the piston 70 and pawl 100 to move forwardly. Thereafter, to apply braking action, it is only necessary to release the pawl from the ratchet 102 by downward pressure on the pawl at its outer end and then returning the handle 92 to its normal position.

What actually goes on within the grooves of the mated members of either the clutch or the brake, when pressure is applied, can be seen and understood by a reference to Fig. 6. In the first place, the outer and inner members are provided with a running fit; in the second place, the grooves in the one member are directed oppositely to the grooves in the other member, thereby forming a series of individual cubical spaces where they cross; and, in the third place, the fluid under pressure is adapted for entering each groove simultaneously at each end, so that the relative motion of the two members in forming these cubical spaces causes the fluid to become locked therewithin and the fluid, being under opposed pressures, instantly and hydrostatically and substantially totally ends the relativity of movement between the members. So, in the clutch, the idle member becomes substantially locked to the driving member, and, in the brake, the moving member becomes substantially locked to the fixed member, although in either case the locking may be made only partial, if so desired.

While the invention has been described with some detail, the description is not intended to be definitive of the limits of the inventive idea. The right is reserved to make such changes and alterations in the details of construction and arrangement of parts as will come within the purview of the attached claims.

What I claim is:

1. In a hydraulic mechanism, a pair of concentrically disposed relatively movable members, said members being formed for a running fit and provided at their confronting surfaces with angularly disposed fluid passageways, and means for directing fluid under pressure through said passageways simultaneously in opposing directions.

2. In a hydraulic mechanism, a pair of concentrically disposed relatively movable members, said members being formed at their confronting surfaces with passageways extending between and angularly related to the sides of said members, and means for directing fluid under pressure simultaneously in opposing directions through said passageways.

3. In a hydraulic mechanism, a pair of concentrically disposed relatively movable members, said members being formed for a running fit and provided at their confronting surfaces with a plurality of intercommunicating fluid passageways extending between the opposite faces of each of said members, the length of each of said passageways being substantially greater than the distance between said faces, and means for directing fluid under pressure through said passageways in opposing directions.

4. In a hydraulic mechanism, a pair of concentrically disposed relatively movable members, said members being formed for a running fit and provided at their confronting surfaces with a plurality of grooves, an opening in and through one of said members in spaced relation to said grooves and in communication therewith, and means for directing fluid under pressure through said opening and said grooves so that said pressure will act in opposing directions within said grooves.

5. In a hydraulic mechanism, a pair of concentrically disposed relatively movable members, said members being formed for a running fit and provided at their confronting surfaces with a plurality of grooved passageways, said passageways extending obliquely between the opposite faces of said members and the passageways of one member being in crossed relation to the passageways of the other member, and means for directing fluid under pressure into said passageways from each end thereof for causing an increasing amount of interlocking between said members as said pressure is increased.

6. In a hydraulic mechanism, a pair of concentrically disposed relatively movable members, said members being formed for a running fit and provided at their confronting surfaces with a plurality of grooved passageways extending obliquely between the opposite faces of said members, an annular passageway in one of said members for intercommunicating said grooved passageways, an axial passageway in one of said members in communication with said annular passageway, a fluid chamber in communication with said axial passageway, and means in said chamber for impressing fluid pressure through said axial and annular passageways into said grooved passageways for simultaneously impressing said pressure into said grooved passageways in opposing directions.

7. In a clutch, a rotatable shaft having formed thereon for rotation therewith a member provided with an internally grooved bore, a second shaft to be driven by said first shaft and provided with an externally grooved member, said latter member being adapted for disposal within said bore and having a running fit therewith, the grooves of one of said members being angularly related to the grooves of the other of said members, and means for creating a hydrostatic pressure within the grooves of said members for locking said members together, the amount of locking being directly proportional to the amount of pressure established.

8. In a brake, a rotatable shaft having formed thereon for rotation therewith an annular member, a rigidly stationary member concentrically disposed with relation to said first member, said members having a running fit and being formed at their confronting surfaces with grooved passageways directed in the one member at an angle to those in the other member, and means for creating a hydrostatic pressure within said passageways for terminating relative rotation between said members, thereby ending the rotation of said shaft.

9. In a hydraulic mechanism, rotatable driving and driven shafts, a pair of annular members on said driven shaft and rotatable therewith, another pair of members each concentrically arranged with respect to said first members and in running fit therewith, all of said members being obliquely grooved at their confronting surfaces, one of said second pair of members being disposed on said driving shaft and rotatable therewith, the other of said second pair of members being fixedly stationary, and means for creating a hydrostatic pressure within the grooves of said member on said driving shaft and grooves of its mating member on said driven shaft for at least reducing the relativity of movement between said last two members, said means being further adapted for creating a hydrostatic pressure within the grooves of said stationary member and the grooves of the other member on said driven shaft for terminating relative rotation between said last two members and thereby stopping the rotation of said driven shaft.

10. In a hydraulic mechanism, a driving shaft and a driven shaft, a pair of clutch members, one of said clutch members being supported on said driving shaft for rotation therewith and the other of said clutch members being supported on said driven shaft for rotation therewith, a pair of brake members for said driven shaft, one of said brake members being fixedly supported on said driven shaft and the other of said brake members being non-rotatable, said clutch members and said brake members being each formed for a running fit and provided at their confronting surfaces with grooved passageways extending obliquely across said members, and means for establishing a hydrostatic pressure within the passageways in said clutch members for at least reducing the relativity of movement between said driven shaft and said driving shaft, said means being further adapted for establishing a hydrostatic pressure within the passageways of said brake members for terminating relative rotation between said driven shaft and said non-rotatable member for stopping the rotation of said driven shaft.

JOHN HALLER.